No. 736,355. PATENTED AUG. 18, 1903.
J. BROENEN.
FOLDING SEAT FOR CARRIAGES.
APPLICATION FILED JUNE 6, 1903.
NO MODEL.
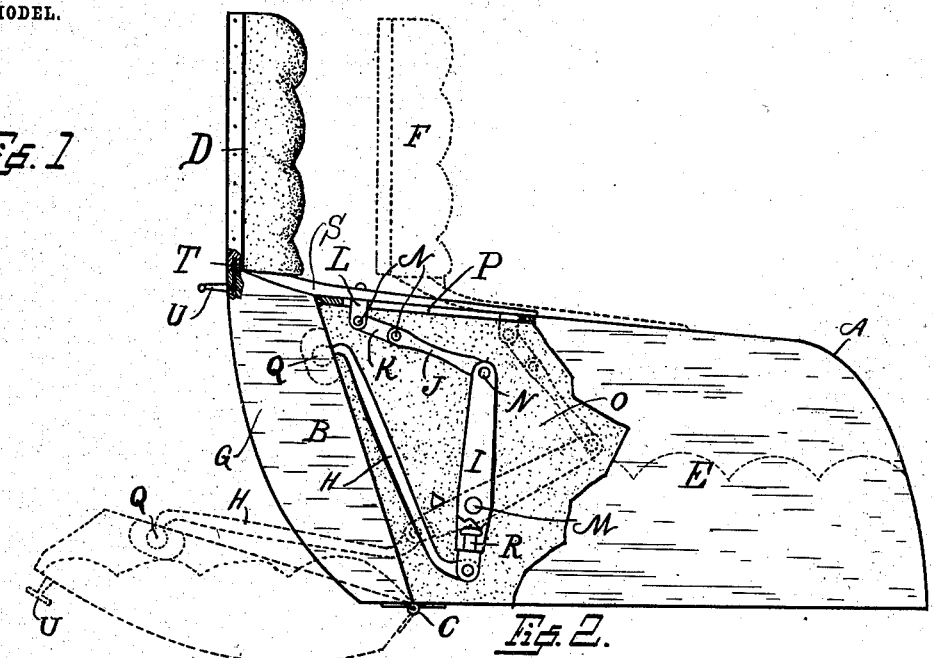
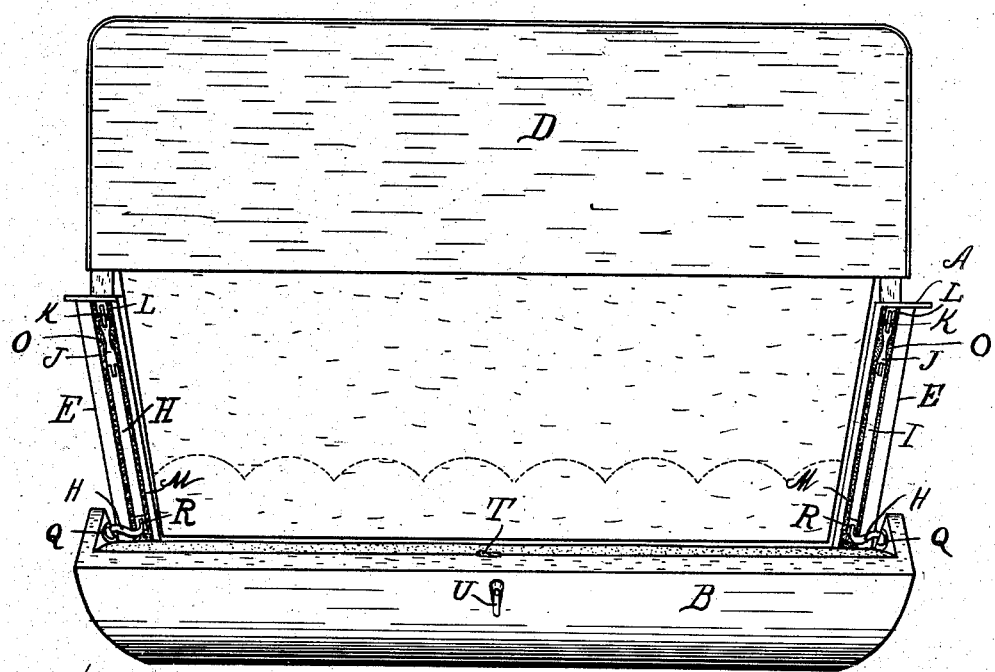
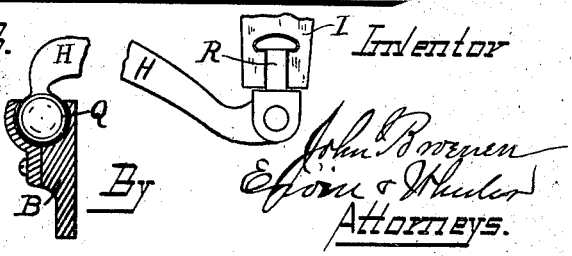
Witnesses: Inventor
John Broenen
By
Attorneys.
THE NORRIS PETERS CO., PHOTO-LITHO., WASHINGTON, D. C.

No. 736,355. Patented August 18, 1903.

UNITED STATES PATENT OFFICE.

JOHN BROENEN, OF MILWAUKEE, WISCONSIN.

FOLDING SEAT FOR CARRIAGES.

SPECIFICATION forming part of Letters Patent No. 736,355, dated August 18, 1903.

Application filed June 6, 1903. Serial No. 160,316. (No model.)

*To all whom it may concern:*

Be it known that I, JOHN BROENEN, a citizen of the United States, residing at Milwaukee, county of Milwaukee, and State of Wisconsin, have invented new and useful Improvements in Folding Seats for Carriages, of which the following is a specification.

My invention relates to improvements in folding seats for carriages, and the same is explained by reference to the accompanying drawings, in which—

Figure 1 represents a side view of the carriage-seat, part broken away to show the interior mechanism. Fig. 2 is a rear view with the folding seat thrown back in position for use. Fig. 3 is a detail.

Like parts are referred to by the same reference-letters throughout the several views.

A represents the front seat of a carriage, to which my folding seat B is secured by the hinges C.

D represents the back of the front seat, which is adjustably supported at its respective ends upon the upper edge of the sides E of the seat A and is adapted to be moved forwardly to the position indicated by dotted lines at F from the position shown in Fig. 1 as the folding seat B is thrown back in position for use, as indicated in said Fig. 1. When, however, the seat B is not in use and is folded to a vertical position, as indicated at G, the back D is thrown backwardly to the rear of the seat A. The adjustable back D is thus automatically moved forwardly and rearwardly by raising and lowering the folding seat B, as hereinafter explained.

The seat B is connected with the adjustable back D through the brace-bar H, lever I, links J and K, and bracket L, which parts are connected together by the bolts N and ball-and-socket joints Q and R. The lever I is pivotally supported from the sides E of the seat upon the pin M. Thus it is obvious that by raising the folding seat B motion is communicated therefrom through said bar H, lever I, links J and K, and the bracket L, whereby the adjustable back D, which is secured to said bracket L, will be thrown rearwardly. By a reverse movement of said seat B motion is communicated to said adjustable back D and the same will be moved in the opposite direction. For convenience of construction the sides of the seat A are provided with an opening or chamber O for the reception of said movable parts, while the upper edge of said seat A is provided with a recess P for the reception of said bracket L. It will be obvious that owing to the fact that the sides E of the seat A are inclined outwardly the line of movement of the bar H and lever I is necessarily brought at an angle to the movement of said seat B, whereby it becomes necessary to connect said parts together by universal joints, as shown in detail in Fig. 3, the outer ends of the bars H being connected with the side of the seat B with the ball-and-socket joint Q, while the inner ends of said bars H are connected with the lever I with the ball-and-socket joint R.

The bracket L is rigidly attached to the back-supporting arm S, which arm serves as a cover for the slot P when the back D is adjusted in its rearward position. The bars H perform the twofold function of a brace for supporting the folding seat B when in position for use, as well as means for communicating movement to the operating mechanism of the adjustable back D.

T is a cam or button which is connected with the handle U. Said cam or button is adapted when the seat is closed to engage said slidable back, whereby said parts are interlocked together.

It is obvious that by my improvement the adjustable back will serve as a back for the folding seat B when the same is being occupied.

Having thus described my invention, what I claim as new, and desire to secure by Letters Patent, is—

1. In a carriage, the combination of a stationary seat; a slidable adjustable back; a separate folding seat hinged at its rear edge to the rear of said stationary seat; mechanism for communicating a forward-and-backward movement to said adjustable back from said folding seat, as the latter is opened and closed, substantially for the purpose specified.

2. In a carriage, the combination of a stationary front seat provided with chambered sides or end pieces; slidably-adjustable back; a separate folding rear seat hinged at its rear edge to the back of said stationary seat; and connecting mechanism located in said chambered sides or end pieces, between said sliding back and folding seat, adapted to communicate motion from said folding seat to said back, substantially as and for the purpose specified.

3. In a carriage, the combination of a stationary front seat provided with chambered sides or end pieces; a slidably-adjustable back supported from the upper edges of said sides or end pieces; a folding rear seat hinged at its lower edge to the rear of said stationary seat; and connecting mechanism located in said chambered sides or end pieces, adapted to communicate motion from said folding seat to said adjustable back, said connecting mechanism consisting of bar H, lever I, links J and K, and bracket L, said parts being connected together and to said seat and adjustable back by the swivel-joints Q and R, and pivotal bolts M and N, all substantially as and for the purpose specified.

In testimony whereof I affix my signature in the presence of two witnesses.

JOHN BROENEN.

Witnesses:
   JAS. B. ERWIN,
   N. Z. TAUGHER.